United States Patent
Geis-Esser et al.

(10) Patent No.: US 11,781,607 B2
(45) Date of Patent: Oct. 10, 2023

(54) HOUSING OF A SOLENOID VALVE UNIT, SOLENOID VALVE UNIT, CLUTCH ACTUATION UNIT, VEHICLE CLUTCH UNIT AND METHOD FOR INSTALLING THE SOLENOID VALVE UNIT

(71) Applicant: KNORR-BREMSE Systeme fuer Nutzfahrzeuge GmbH, Munich (DE)

(72) Inventors: Daniel Geis-Esser, Munich (DE); Martin Kral, Munich (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 105 days.

(21) Appl. No.: 17/310,301

(22) PCT Filed: Jan. 16, 2020

(86) PCT No.: PCT/EP2020/051046
§ 371 (c)(1),
(2) Date: Jul. 27, 2021

(87) PCT Pub. No.: WO2020/156824
PCT Pub. Date: Aug. 6, 2020

(65) Prior Publication Data
US 2022/0196085 A1 Jun. 23, 2022

(30) Foreign Application Priority Data
Jan. 28, 2019 (DE) .................... 10 2019 201 020.2

(51) Int. Cl.
*F16D 25/08* (2006.01)
*F16D 25/12* (2006.01)
(Continued)

(52) U.S. Cl.
CPC .......... *F16D 25/083* (2013.01); *F16D 25/12* (2013.01); *F16K 27/00* (2013.01);
(Continued)

(58) Field of Classification Search
CPC .. F16D 25/00–25/14; F16D 2048/0209; F16D 2048/0221; F16D 2250/0084;
(Continued)

(56) References Cited

U.S. PATENT DOCUMENTS 4,368,703 A 1/1983 Shibata
11,155,163 B2 * 10/2021 Klostermann ......... B60K 23/02
(Continued)

FOREIGN PATENT DOCUMENTS

CN 104154142 A 11/2014
CN 105121915 A 12/2015
(Continued)

OTHER PUBLICATIONS

International Search Report (PCT/ISA/210) issued in PCT Application No. PCT/EP2020/051046 dated Apr. 20, 2020 with English translation (five (5) pages).
(Continued)

Primary Examiner — Richard M Lorence
(74) Attorney, Agent, or Firm — Crowell & Moring LLP

(57) ABSTRACT

A housing of a solenoid valve unit for controlling a central clutch actuator of a utility vehicle is configured for installation in a transmission housing, preferably in a clutch case, and for accommodating at least one solenoid valve. The housing has an elongate housing shape that is curved along its longitudinal direction to enable installation in tight spaces.

18 Claims, 2 Drawing Sheets

(51) Int. Cl.
    *F16K 27/00*      (2006.01)
    *F16D 48/02*      (2006.01)

(52) U.S. Cl.
    CPC .. *F16D 2048/0221* (2013.01); *F16D 2300/18* (2013.01); *F16D 2300/26* (2013.01)

(58) Field of Classification Search
    CPC ............. F16D 2300/18; F16D 2300/26; F16K 27/00–27/12
    USPC .................................. 192/85.01–85.63, 112
    See application file for complete search history.

(56) References Cited

U.S. PATENT DOCUMENTS

| | | | |
|---|---|---|---|
| 11,512,752 B2* | 11/2022 | Zetterstrand | F16D 48/02 |
| 2003/0010590 A1 | 1/2003 | Hardtle | |
| 2004/0261570 A1 | 12/2004 | Suzuki et al. | |
| 2008/0188339 A1 | 8/2008 | Bader et al. | |
| 2014/0354268 A1 | 12/2014 | Kouno et al. | |
| 2018/0123420 A1 | 5/2018 | Kombowski et al. | |
| 2019/0178370 A1* | 6/2019 | Dick | F16K 31/0613 |

FOREIGN PATENT DOCUMENTS

| | | |
|---|---|---|
| CN | 106246904 A | 12/2016 |
| CN | 207298018 U | 5/2018 |
| CN | 108291639 A | 7/2018 |
| CN | 109072993 A | 12/2018 |
| DE | 197 35 784 A1 | 2/1999 |
| DE | 198 26 068 A1 | 12/1999 |
| DE | 100 05 086 A1 | 8/2001 |
| DE | 10 2005 021 761 A1 | 11/2006 |
| DE | 10 2005 049 988 A1 | 4/2007 |
| JP | 56-107909 A | 8/1981 |
| WO | WO 2008/058862 A1 | 5/2008 |
| WO | WO 2016/165705 A1 | 10/2016 |

OTHER PUBLICATIONS

German-language Written Opinion (PCT/ISA/237) issued in PCT Application No. PCT/EP2020/051046 dated Apr. 20, 2020 (five (5) pages).

German-language Office Action issued in German Application No. 10 2019 201 020.2 dated Jan. 8, 2020 (eight (8) pages).

International Preliminary Report on Patentability (PCT/IB/326 & PCT/IB/373) issued in PCT Application No. PCT/EP2020/051046 dated Aug. 12, 2021, including English translation of document C2 (German-language Written Opinion (PCT/ISA/237), filed on Jul. 27, 2021) (seven (7) pages).

Chinese-language Office Action issued in Chinese Application No. 202080011000.5 dated Sep. 2, 2022 with English translation (13 pages).

* cited by examiner

HOUSING OF A SOLENOID VALVE UNIT, SOLENOID VALVE UNIT, CLUTCH ACTUATION UNIT, VEHICLE CLUTCH UNIT AND METHOD FOR INSTALLING THE SOLENOID VALVE UNIT

BACKGROUND AND SUMMARY OF THE INVENTION

The invention relates to a housing of a solenoid valve unit, to a solenoid valve unit, to a clutch actuation unit, to a vehicle clutch unit, and to a method for mounting the solenoid valve unit, in particular to a housing of a solenoid valve unit, to a solenoid valve unit, to a clutch actuation unit, to a vehicle clutch unit, and to a method for mounting the solenoid valve unit for utility vehicles.

A clutch actuator as an actuator for decoupling and coupling a vehicle clutch for utility vehicles has also been provided for some time as a central clutch actuator which is arranged concentrically about a drive shaft. The clutch actuator is actuated via a medium, for example compressed air or a hydraulic fluid, solenoid valves usually being used to actuate the clutch actuator. In order to save installation space and to decrease a number of feed lines and branches, a plurality of solenoid valves are combined to form a solenoid valve unit as one assembly. The solenoid valve unit is either integrated into a transmission actuator, or is mounted in a separate housing on a clutch case.

In order, furthermore, to save components, the solenoid valve unit is docked on the clutch actuator, the pneumatic or fluid outlets of the solenoid valve unit being coupled without intermediate lines directly or via pressure-tight equalization elements to the clutch actuator. This results in a defined position of the solenoid valve unit. On account of a cuboid design of the solenoid valve unit which has been customary up to now, mounting at the defined position can be from difficult to impossible, however, on account of constricted space conditions.

The invention is based on the object of providing a solenoid valve unit which overcomes these disadvantage and makes mounting possible even in the case of constricted space conditions.

The object is achieved by way of a housing of a solenoid valve unit, a solenoid valve unit, a clutch actuation unit, a vehicle clutch unit, and a method, according to the independent claims. Advantageous developments of the invention are contained in the dependent claims.

In accordance with one aspect of the invention, a housing of a solenoid valve unit for actuating a central clutch actuator, the housing being configured for mounting in a transmission housing, preferably in a clutch case, and for receiving at least one solenoid valve, has an elongate housing shape which is of curved configuration along its longitudinal direction.

An elongate housing shape means that the housing of the solenoid valve unit has three directions in the manner of a coordinate system, a dimension in one of the directions being greater than the dimensions in the two other directions. The direction with the greater dimension forms the longitudinal direction of the housing of the solenoid valve unit.

As a result of the housing shape which is curved along the longitudinal direction, a projected dimension in the longitudinal direction for the provision of a defined number of valves is smaller, with the result that mounting is possible even in the case of constricted space conditions.

In one advantageous embodiment, the housing has, at one end of the elongate housing shape, a flange for mounting into a predefined opening of the transmission housing or the clutch case.

On account of the provision of the flange on the housing, the housing can be mounted simply on the transmission housing or the clutch case, it being possible for the predefined opening to be closed simply by way of the flange, without additional coverings being provided.

In a further advantageous embodiment, the housing has, in a state in which it is installed in the transmission housing or in the clutch case, a preferably projecting receiving section for accommodating a sensor element on an inner end section of the elongate housing shape.

By way of the receiving section for receiving the sensor element, the sensor element can be attached simply without additional holding devices.

In a further advantageous embodiment, the housing has, in the state in which it is mounted in the transmission housing or in the clutch case, a connecting apparatus which serves for the connection to the central clutch actuator on the inner end section of the elongate housing shape.

By way of a provision of the connecting apparatus, the housing can be connected simply to the central clutch actuator.

In accordance with a further aspect of the invention, a solenoid valve unit has the housing with an elongate housing shape which is curved along its longitudinal direction, and at least one solenoid valve in the housing.

The solenoid valve unit with the housing which is curved along its longitudinal direction makes it possible for the solenoid valve unit to be introduced along a curved movement axis into an opening of the transmission housing or the clutch case, which opening is adapted to a cross section of the solenoid valve unit. The opening which is adapted to the cross section of the solenoid valve unit has a size and a cross section which firstly make it possible to mount the solenoid valve unit through the opening, and secondly the opening is as small as possible, in order to not unnecessarily decrease a strength and rigidity of the transmission housing or the clutch case. By virtue of the fact that the introduced solenoid valve unit does not have to extend away from the transmission housing or the clutch case at an approximate right angle, as in the case of a cuboid shape, in order then to be introduced in an approximately linear manner, a space requirement for mounting the solenoid valve unit in the transmission housing or the clutch case is decreased.

In one advantageous refinement, the solenoid valve unit has at least one solenoid valve which is configured to actuate the central clutch actuator.

If solenoid valves which actuate the central clutch actuator are provided by way of the solenoid valve unit, said solenoid valves can be mounted without additional connecting complexity by way of additional lines and without additional fastening complexity by means of additional holders, with the result that the number of parts and the mounting complexity are decreased.

In accordance with a further advantageous refinement of the solenoid valve unit, the solenoid valve unit has a sensor unit which is configured to detect a linear displacement of the clutch actuator, for example via the position of a piston in the central clutch actuator.

On account of the provision of the sensor element by way of the solenoid valve unit, it is possible to detect the position of the piston in the central clutch actuator, without additional fastening means being provided for the sensor element, with the result that the number of parts and the mounting complexity can be decreased.

In a further advantageous refinement of the solenoid valve unit, the sensor element is arranged in the longitudinal direction in an end section of the solenoid valve unit.

As a result of the arrangement, it is possible for the sensor element to be moved close to the central clutch actuator, in order to make a reliable detection of the position of the piston in the central clutch actuator possible.

In the case of one advantageous refinement of the solenoid valve unit, the solenoid valve unit has a media interface.

In the case of a provision of the media interface, a plurality of valves or all the valves of the solenoid valve unit can be supplied and actuated via a small number of connectors, with the result that once again the number of parts and the mounting complexity are decreased.

In accordance with a further advantageous refinement of the solenoid valve unit, it has solenoid valves which are configured to actuate a layshaft brake of a vehicle manual transmission.

On account of the provision of the valves by way of the solenoid valve unit, it is not required for the valves to be fastened and connected separately, which once again decreases the number of parts and the mounting complexity.

In accordance with a further aspect of the invention, a clutch actuation unit is provided which has the solenoid valve unit and the central clutch actuator.

By way of the provision of the clutch actuation unit with the solenoid valve unit and the central clutch actuator, the components can be designed so as to be matched with one another, which makes precise dimensioning possible, with the result that an excessive space requirement and excessively high manufacturing costs can be avoided.

In one advantageous refinement of the clutch actuation unit, the solenoid valve unit is configured to be fastened to the central clutch actuator.

On account of the direct fastening of the solenoid valve unit to the central clutch actuator, reliable direct coupling of the solenoid valve unit to the central clutch actuator is possible.

In accordance with a further aspect of the invention, a vehicle clutch unit with the clutch actuation unit is provided, the transmission housing or the clutch case having an opening which is adapted to a cross section of the solenoid valve unit, and the solenoid valve unit being configured to be mounted into the opening.

The opening which is adapted to the cross section of the solenoid valve unit has a size and a cross section which firstly make it possible to mount the solenoid valve unit through the opening, and secondly the opening is as small as possible, in order not to unnecessarily decrease a strength and rigidity of the transmission housing or the clutch case. A circumferential gap which is therefore produced and is as small as possible can then possibly be closed by way of a circumferential, flange-like projection which is arranged on the solenoid valve, with the result that no additional covering is required.

In accordance with a further aspect of the invention, a method is provided which has the step of introducing of the solenoid valve unit into the opening along a movement axis which is matched with a curved housing shape of the solenoid valve unit (3) in the longitudinal direction.

By way of the introduction into the opening along the movement axis which is matched to the curved shape in the longitudinal direction, it is possible for the solenoid valve unit to be introduced into a smallest possible opening of the transmission housing or the clutch case, even if an available assembly space is small.

The invention will now be described in greater detail on the basis of one exemplary embodiment with reference to the appended drawings.

DETAILED DESCRIPTION OF THE DRAWINGS

Figure 1:
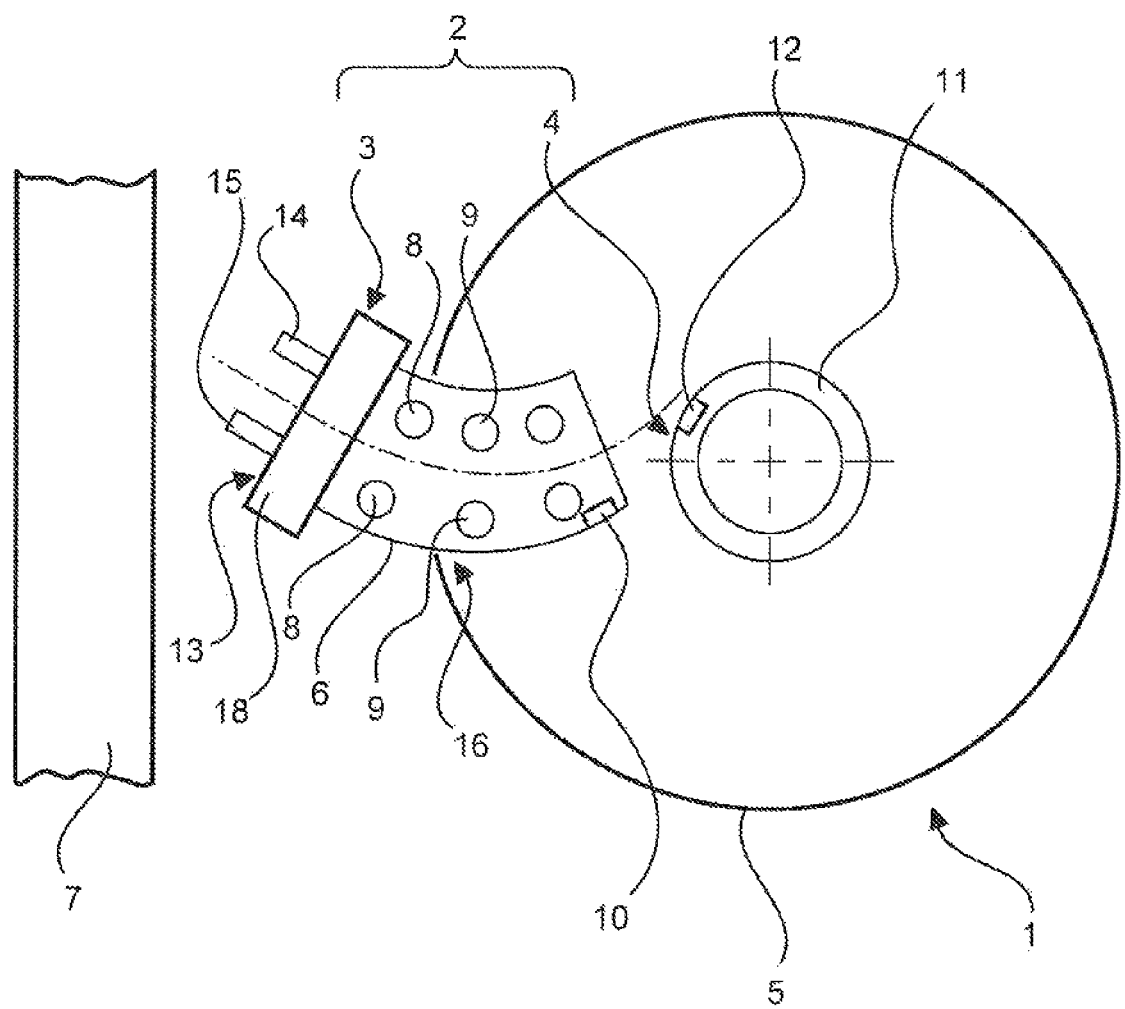
FIG. 1 is an outline illustration of a vehicle clutch unit according to an embodiment of the invention with a clutch actuation unit and with a solenoid valve unit in a position during mounting into a clutch case.

FIG. 1 shows an outline illustration of a vehicle clutch unit 1 of a utility vehicle, which vehicle clutch unit 1 has a clutch actuation unit 2 with a solenoid valve unit 3 and a central clutch actuator 4. Furthermore, the vehicle clutch unit 1 has a clutch case 5. The solenoid valve unit 3 is shown in a position during mounting into the clutch case 5. Furthermore, the central clutch actuator 4 is provided in the clutch case 5, in order to couple and decouple a vehicle clutch. As an alternative, the clutch actuation unit 2 is not provided in the clutch case 5, but rather in a transmission housing or another housing.

The solenoid valve unit 3 has a housing 6 which has an elongate housing shape which is curved in its longitudinal direction. A curvature radius is fixed in such a way that introducing of the solenoid valve unit 3 into the clutch case 5 is possible even if there are constricted space conditions, as shown by way of an installation space boundary 7. The installation space boundary 7 is, for example, a support in the utility vehicle. The housing 6 is configured to be mounted in the clutch case 5 and to receive at least one solenoid valve 8, 9. Furthermore, the housing 6 has a flange 18 for mounting into a predefined opening 16 of the clutch case 5. Moreover, the housing 6 has, on an inner end section of the elongate housing shape in a state in which it is mounted in the clutch case 5, a projecting receiving section for receiving a sensor element 10, and a connecting apparatus which serves for the connection to the central clutch actuator 4. In alternative embodiments, the projecting receiving section, the flange 18 and the connecting apparatus are not provided.

The solenoid valve unit 3 has a plurality of solenoid valves 8, 9 in the elongate housing 6. The solenoid valves 8 are configured to actuate the central clutch actuator 4. Here, the vehicle clutch is coupled or decoupled. In one alternative embodiment, only one solenoid valve for actuating the central clutch actuator 4 can also be provided.

Furthermore, the solenoid valve unit 3 has the solenoid valves 9 which are configured to actuate a layshaft brake (not shown) of a vehicle manual transmission. As an alternative, only one solenoid valve 9 is provided, or the solenoid valves 9 are omitted.

Moreover, the solenoid valve unit 3 has a sensor element 10. The sensor element 10 is configured to detect a position of a piston 11 in the central clutch actuator 4. The piston 11 has a transmitter 12 which can be detected by the sensor element 10, in order to detect the position of the piston 11. The transmitter 12 is configured as a magnet, and is detected by the sensor element 10 which is provided as a magnetic sensor. In alternative embodiments, different transmitters with specific properties which are matched to the sensor element 10 are provided, with the result that the position of the piston 11 can be detected by way of them.

The sensor element 10 is arranged in the longitudinal direction of the solenoid valve unit 3 in the region of one end of the solenoid valve unit 3. In alternative embodiments, the sensor element 10 is arranged at another location on the solenoid valve unit 3. It is essential here that the sensor element 10 is arranged in such a way that its detection region can detect the transmitter 12 in a mounted state of the solenoid valve unit 3.

Furthermore, the solenoid valve unit 3 has a media interface 13. The media interface 13 has a pneumatic or fluid connector 14 and electric connectors 15 for supplying and actuating the solenoid valves 8, 9 and for transmitting the signals of the sensor element 10.

The clutch case 5 is provided with an opening 16. The opening 16 is adapted to a cross section of the solenoid valve unit 3. This means that the opening 16 has a size and a cross section which firstly make it possible to mount the solenoid valve unit 3 through the opening 16, and secondly the opening 16 is as small as possible, in order not to unnecessarily decrease a strength and rigidity of the clutch case 5.

Figure 2:
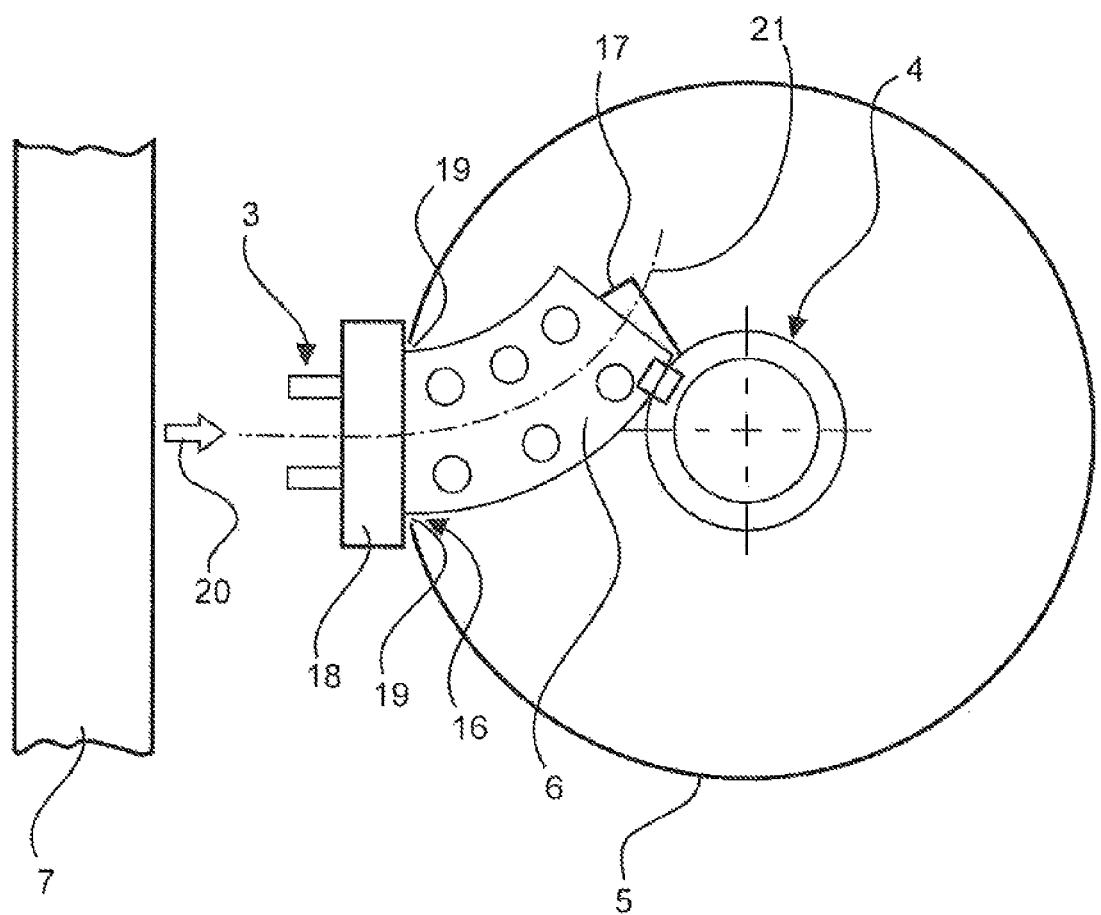
FIG. 2 is an outline illustration of the vehicle clutch unit from FIG. 1 with the clutch actuation unit with the solenoid valve unit in a state in which it is mounted in the clutch case.

FIG. 2 shows an outline illustration of the clutch actuation unit 2 with the solenoid valve unit 3 in a state in which it is mounted in the clutch case 5.

In the mounted state, the solenoid valve unit 3 is fastened to the central clutch actuator 4 by way of a fastener 17 which is shown in outline. As an alternative, no fastening of the solenoid valve unit 3 to the central clutch actuator 4 is provided, but rather the solenoid valve unit 3 is fastened, for example, merely to the clutch case 5.

The housing 6 has the flange 18, by means of which the solenoid valve unit 3 is fastened to the clutch case 5. Furthermore, the flange 18 serves to close a gap 19 in the adapted opening 16 between the clutch case 5 and the solenoid valve unit 3.

In the case of mounting of the solenoid valve unit 3 into the opening 16, one end of the solenoid valve unit 3 is first of all introduced into the opening 16. Subsequently, as shown by way of an arrow 20, the solenoid valve unit 3 is introduced into the opening 16 along a movement axis 21 which is matched with a curved shape in the longitudinal direction, and is coupled to the central clutch actuator 4. In the case of the introduction, the solenoid valve unit 3 is pivoted about a virtual pivot point, with the result that a linear introducing movement, as in the conventional case, is not carried out, but rather a pivoting movement which makes the space-saving mounting possible.

Thereupon, the solenoid valve unit 3 is fastened to the clutch case 5 by means of the flange 18 via fasteners, for example screws, and the connectors of the media interface 13 are connected to corresponding connector lines.

All of the features which are shown in the description, the following claims and the drawing can be essential to the invention both individually and also in any desired combination with one another.

LIST OF DESIGNATIONS

1 Vehicle clutch unit
2 Clutch actuation unit
3 Solenoid valve unit
4 Central clutch actuator
5 Clutch case
6 Housing
7 Installation space boundary
8 Solenoid valve (for central clutch actuator)
9 Solenoid valve (for layshaft brake)
10 Sensor element
11 Piston
12 Transmitter
13 Media interface
14 Pneumatic or fluid connector
15 Electric connectors
16 Opening
17 Fastener
18 Flange
19 Gap
20 Mounting movement

What is claimed is:

1. An apparatus of a solenoid valve unit for actuating a central clutch actuator, comprising:
   a housing having an elongate housing shape which is curved along its longitudinal direction, wherein
   the housing is configured for receiving at least one solenoid valve and is introducible into an opening of a transmission housing along a movement axis which is matched with the curved elongate housing shape in the longitudinal direction.

2. The apparatus as claimed in claim 1, wherein
   the transmission housing is a clutch case.

3. The apparatus as claimed in claim 2, wherein
   the housing has, at one end of the elongate housing shape, a flange for mounting into the opening of the clutch case.

4. The apparatus as claimed in claim 2, wherein
   the housing has, in an installed state in the clutch case, a projecting receiving section for accommodating a sensor element on an inner end section of the elongate housing shape.

5. The apparatus as claimed in claim 2, wherein
   the housing has, in an installed state in the clutch case, a connecting apparatus which serves for connection to the central clutch actuator on an inner end section of the elongate housing shape.

6. The apparatus as claimed in claim 1, wherein
   the housing has, at one end of the elongate housing shape, a flange for mounting into the opening of the transmission housing.

7. The apparatus as claimed in claim 1, wherein
   the housing has, in an installed state in the transmission housing, a projecting receiving section for accommodating a sensor element on an inner end section of the elongate housing shape.

8. The apparatus as claimed in claim 1, wherein
   the housing has, in an installed state in the transmission housing, a connecting apparatus which serves for connection to the central clutch actuator on an inner end section of the elongate housing shape.

9. A solenoid valve unit, comprising:
   an apparatus as claimed in claim 1, and
   at least one solenoid valve of the solenoid valve unit.

10. The solenoid valve unit as claimed in claim 9, wherein
    the solenoid valve unit has at least one solenoid valve which is configured to actuate the central clutch actuator.

11. The solenoid valve unit as claimed in claim 9, wherein
    the solenoid valve unit has a sensor element which is configured to detect a position of a piston in the central clutch actuator.

12. The solenoid valve unit as claimed in claim 11, wherein the sensor element is arranged in the longitudinal direction of the solenoid valve unit in an end section of the solenoid valve unit.

13. The solenoid valve unit as claimed in claim 9, wherein the solenoid valve unit has a media interface.

14. The solenoid valve unit as claimed in claim 9, wherein the solenoid valve unit has solenoid valves which are configured to actuate a layshaft brake of a vehicle manual transmission.

15. A clutch actuation unit, comprising:
a solenoid valve unit as claimed in claim 9, and
a central clutch actuator.

16. The clutch actuation unit as claimed in claim 15, wherein
the solenoid valve unit is configured to be fastened to the central clutch actuator.

17. A vehicle clutch unit, comprising:
a clutch actuation unit as claimed in claim 15, wherein the transmission housing, in the form of a clutch case, has an opening which is adapted to a cross section of the solenoid valve unit, and
the solenoid valve unit is configured to be mounted into the opening.

18. A method for mounting a solenoid valve unit into an opening of a transmission housing or a clutch case, the method comprising:
providing the solenoid valve unit for actuating a central clutch, the solenoid valve unit comprising a housing having an elongate housing shape which is curved along its longitudinal direction; and
introducing the solenoid valve unit into the opening along a movement axis which is matched with the curved housing shape of the solenoid valve unit in the longitudinal direction.

* * * * *